(12) United States Patent
Malini (10) Patent No.: US 7,322,919 B2
(45) Date of Patent: Jan. 29, 2008

(54) MACHINE AND METHOD FOR FORMING TUBULAR LENGTHS OF PACKAGING FILM

(75) Inventor: Massimo Malini, Bologna (IT)

(73) Assignee: Aetna Group S.p.A., Rimini (IT)

( * ) Notice: Subject to any disclaimer, the term of this patent is extended or adjusted under 35 U.S.C. 154(b) by 263 days.

(21) Appl. No.: 11/121,270

(22) Filed: May 3, 2005

(65) Prior Publication Data

US 2006/0025294 A1    Feb. 2, 2006

(30) Foreign Application Priority Data

Jul. 30, 2004    (IT)    .......................... BO2004A0491

(51) Int. Cl.
    *B31C 11/04*    (2006.01)
(52) U.S. Cl. ...................... 493/175; 493/278; 493/241; 493/176; 493/296; 53/563
(58) Field of Classification Search ................ 493/276, 493/278, 279, 280, 283, 296, 241, 242, 175, 493/176; 53/563, 456
    See application file for complete search history.

(56) References Cited

U.S. PATENT DOCUMENTS

| | | | | |
|---|---|---|---|---|
| 3,385,746 A | * | 5/1968 | Rohn | 156/443 |
| 3,676,271 A | * | 7/1972 | Hake | 156/567 |
| 3,704,566 A | * | 12/1972 | Zimmermann | 53/397 |
| 3,851,443 A | | 12/1974 | Fine | |
| 3,866,394 A | * | 2/1975 | Masai | 53/562 |
| 4,135,347 A | | 1/1979 | Lowdermilk | |
| 4,151,024 A | * | 4/1979 | Ohlsson | 156/69 |
| 4,284,448 A | | 8/1981 | Pupp et al. | |
| 4,305,240 A | * | 12/1981 | Grevich et al. | 53/374.6 |
| 4,349,345 A | * | 9/1982 | Bodendoerfer | 493/295 |
| 4,409,045 A | * | 10/1983 | Busse | 156/69 |
| 4,534,918 A | * | 8/1985 | Forrest, Jr. | 264/467 |
| 4,759,171 A | * | 7/1988 | Bruveris et al. | 53/563 |
| 4,805,380 A | * | 2/1989 | Mosse | 53/458 |
| 4,838,846 A | * | 6/1989 | Focke et al. | 493/132 |
| 5,593,375 A | * | 1/1997 | Franci | 493/302 |
| 5,867,966 A | * | 2/1999 | Mogard | 53/133.2 |
| 5,992,489 A | * | 11/1999 | Busse | 156/443 |
| 6,131,366 A | * | 10/2000 | Fukuda | 53/64 |
| 6,612,094 B1 | * | 9/2003 | Bailey et al. | 53/234 |
| 7,090,630 B2 | * | 8/2006 | Boldrini et al. | 493/51 |

FOREIGN PATENT DOCUMENTS

| DE | 525 476 | 5/1931 |
|---|---|---|
| DE | 10 11 714 | 7/1957 |
| DE | 11 54 335 | 9/1963 |

OTHER PUBLICATIONS

European Search Report dated Dec. 23, 2005, corresponding to EP 05 42 5275.

* cited by examiner

*Primary Examiner*—Sameh H. Tawfik
(74) *Attorney, Agent, or Firm*—Fay Sharpe LLP (57) ABSTRACT

A machine for forming tubular film lengths from a linear portion of film comprises: a unit (1) for feeding linear film portions (2); at least one forming roller (3) that revolves about an axis (7) transversal to the direction of film feed; means (14) for applying the film portion (2) to the surface of the forming roller (3) as it revolves, at least until opposite edges (4, 5) of the film portion (2) overlap; and means (11) for joining the overlapping edges (4, 5) to each other to form a tubular film length (6).

26 Claims, 7 Drawing Sheets

MACHINE AND METHOD FOR FORMING TUBULAR LENGTHS OF PACKAGING FILM

BACKGROUND OF THE INVENTION

The present invention addresses the sector of packaging groups of products using tubular film lengths.

In particular, the invention relates to a machine for forming tubular film lengths capable of being stretched to size, placed over the products and left to return to their original size in such a way as to wrap the products.

The same inventive concept can be applied to the formation of non-stretch or low-stretch film, such as, for example, heat-shrink wrapping film.

At present, a method for forming tubular film lengths from a continuous film that is already tubular in shape is known.

This method, however, has several disadvantages due to the relatively high cost of the tubular film and the impossibility of forming tubes with openings differing in size from those of the original tube.

A method for forming tubular film lengths from a linear film web is also known.

In this case, the linear film web is fed from a roll, cut to size and wound lengthwise, that is to say, about an axis parallel to the direction of feed, around a fixed forming roller until the two longitudinal edges of the film overlap and can be joined to each other, for example by sealing.

This method and the machines that implement it are not free of disadvantages, however.

A first disadvantage is due to the fact that the maximum radial dimension of the tube formed is limited by the width of the film fed.

A second disadvantage is that the elastic behavior of roll-fed film webs is normally directional to varying degrees, although the film tends to stretch better in the longitudinal direction, that is, in the direction of roll unwinding. When the film is stretched, therefore, it is drawn in the direction transversal to the main direction, thus not using the properties of the film to best advantage.

Yet another drawback of prior art methods is that their productivity is low, which means that they limit the overall productivity of the wrapping machinery that includes a station for forming the required lengths of film.

This invention has for its principal aim to overcome the above mentioned drawbacks by providing a high productivity machine that is easily adaptable to different product sizes and that uses the directional mechanical properties of the film to best advantage.

SUMMARY OF THE INVENTION

This aim is achieved in a machine and a method for forming tubular film lengths according to the main appended claims.

Other results and advantages are achieved in a machine according to the dependent claims.

Another advantageous feature of the invention is the possibility of feeding formed lengths of film to an intermediate station constituting a reservoir for a wrapping installation.

Yet another advantage of the invention is that it is suitable for flexible modular structures adaptable to production requirements.

BRIEF DESCRIPTION OF THE DRAWINGS

The technical characteristics of the invention, with reference to the above objects, are clearly described in the claims below and its advantages are apparent from the detailed description which follows, with reference to the accompanying drawings which illustrate a preferred embodiment of the invention provided merely by way of example without restricting the scope of the inventive concept, and in which:

DESCRIPTION OF THE PREFERRED EMBODIMENTS

Figure 1:
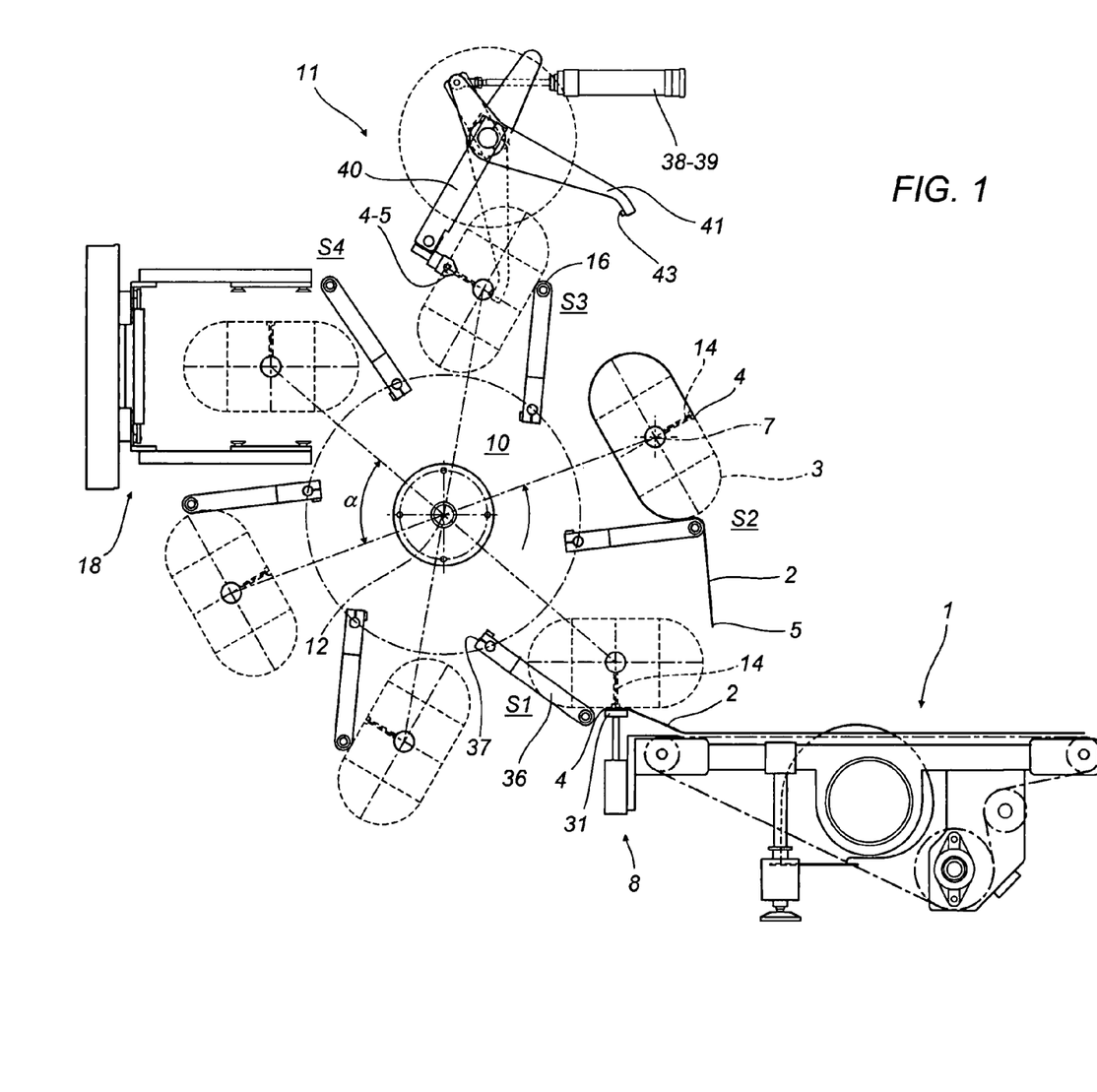
FIG. 1 is a kinematic diagram of a machine according to the invention.

Described with reference to the accompanying drawings and, in particular, FIG. 1, is a machine for forming tubular film lengths from a straight portion of film. The machine comprises:

a unit 1 for feeding linear film portions 2, located at a feed station S1;

at the station S1 there is an applicator 8 for fixing a first edge 4 of the film portion 2 to one of a plurality of forming rollers 3, oriented transversally to the direction of film 2 feed and equispaced by an angle α around the circumference of a carousel 10 that rotates about a horizontal axis 12.

The forming rollers 3 are in turn rotatable about horizontal axes 7 so that the portion of film 2 applied to them is wound around each of them until the second edge 5 of the portion 2 overlaps the first edge 4. In other embodiments of the invention, with suitable adaptations, the same result might be obtained by making the forming rollers 3 and the carousel 10 rotate about vertical or inclined axes;

a sealing device 11 for joining the first and second edges 4, 5 to each other to form a tubular film length 6 at a sealing station S3;

an extraction unit 18 for removing the tubular film lengths from the forming rollers 3 at an unloading station S4.

Figures 2, 2A:
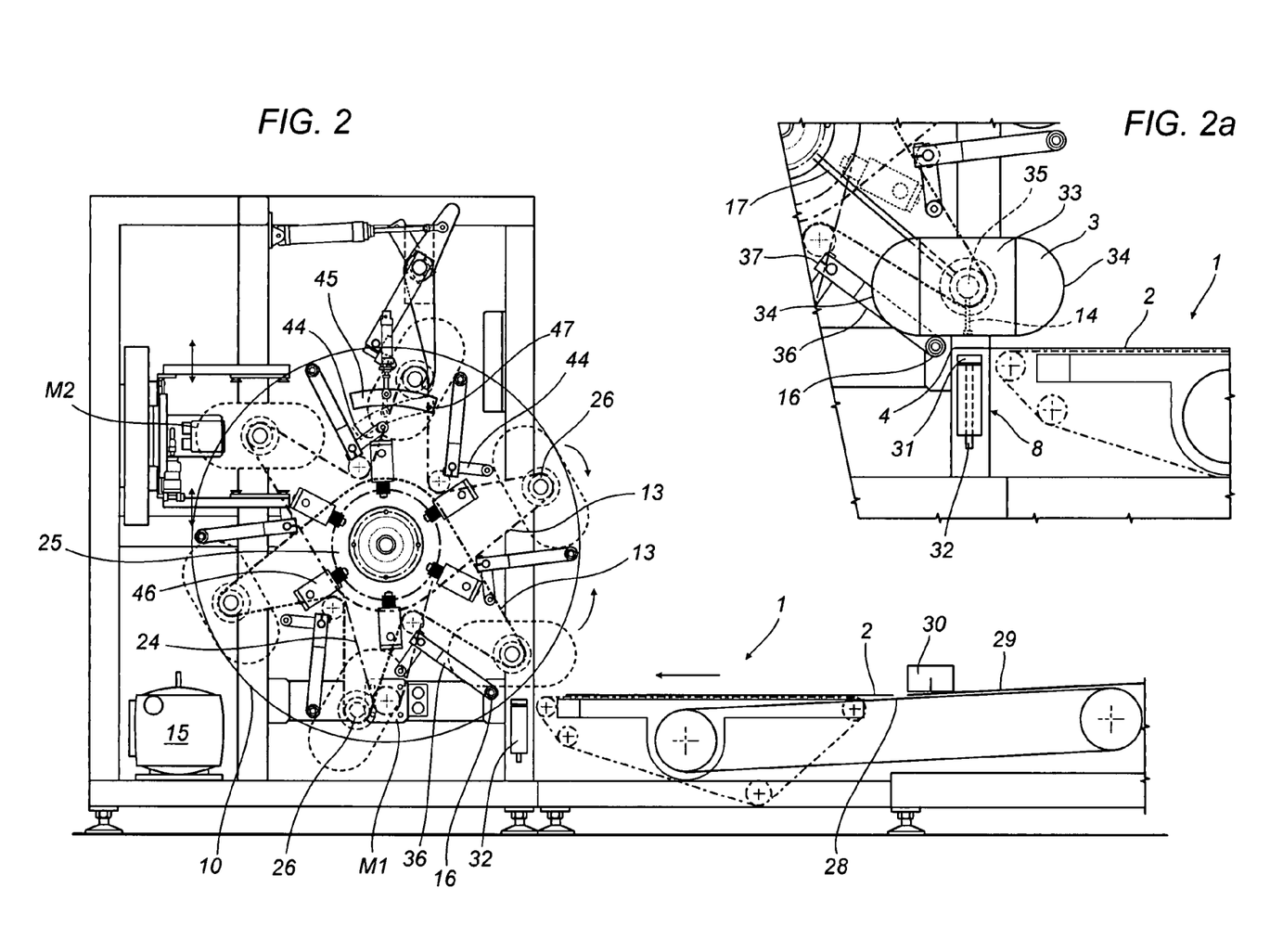
FIG. 2 is a front view of a preferred embodiment of the machine according to the invention.
FIG. 2a is detail view showing the feed unit of the machine of FIG. 2.

With reference in particular to FIGS. 2 and 2a, the feed unit 1 comprises a conveyor belt 28, fed with a web 29, for example a web unwound from a roll, and equipped with a cutting device, such as a blade 30, for making linear film portions 2 of the required size.

The belt 28 feeds an applicator 8, consisting preferably of a suction head 31, mounted on a vertical cylinder 32, that catches hold of the edge 4 protruding from the belt 28 and pulls it upwards until it meets the forming roller 3 waiting at the feed station S1 at that moment.

In the preferred embodiment of the machine illustrated in FIGS. 2 and 2a, there are six forming rollers 3 mounted around the carousel 10 at equal angular intervals α of 60°.

In particular, the carousel 10 is rotationally driven in an counterclockwise direction by a brushless motor M1 through a toothed belt 24 trained around the motor's output shaft and a pulley 25 attached to the carousel 10.

As the carousel 10 rotates, the forming rollers 3 also rotate counterclockwise, driven by two toothed belts 13 that connect the pulley 25 of the carousel 10 to respective pulleys 26 attached to groups of three contiguous forming rollers 3.

The rotation ratio of carousel to forming rollers is preferably 1:5, but it will be understood that both the kinematic connection and the rotation ratio may be varied according to requirements and according to the constructional geometry of the machine.

In addition, the forming rollers 3 and the carousel 10 might also be made to rotate in the same direction using gears instead of the belts 13.

Moreover, in the case of a motor connected directly, the direction of rotation is not significant.

Figure 6:
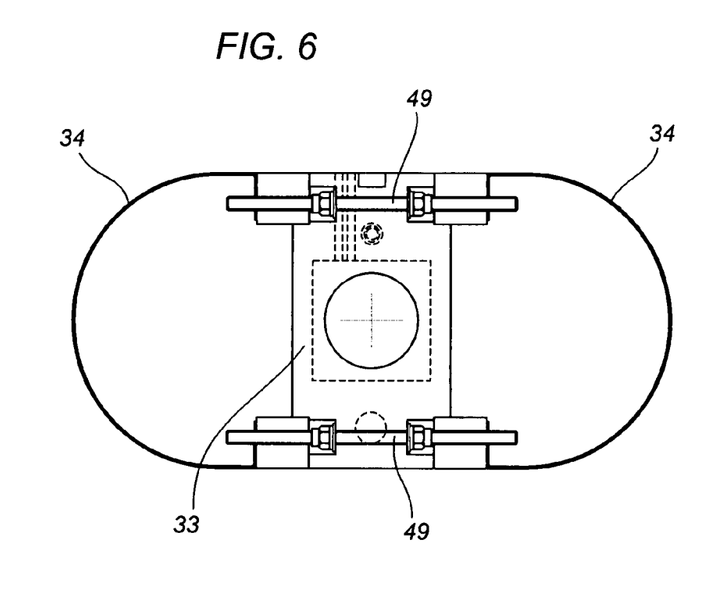
FIG. 6 is a front detail view of a roller for forming the film lengths.

As shown in FIG. 6, the forming rollers 3 preferably have an approximately elliptic cross section and comprise a parallelepiped shaped central hollow body 33 mounted on a shaft, also hollow, and connected to the suction system.

Figure 8A:
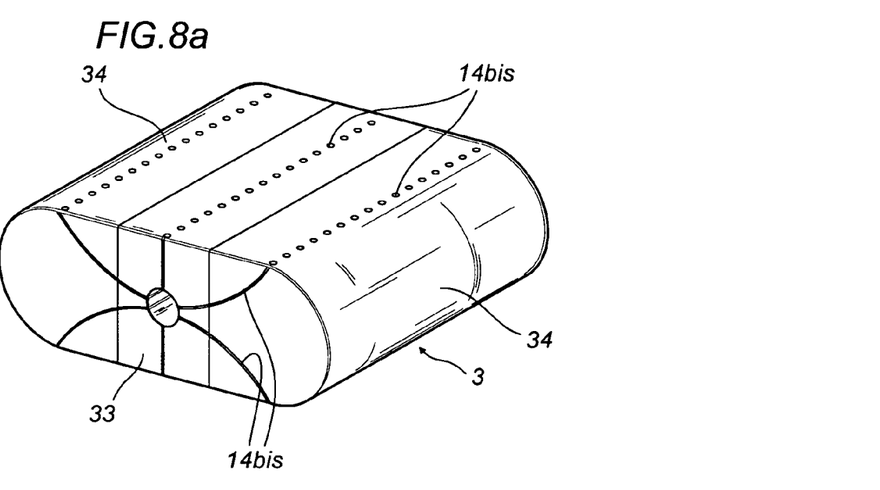
FIGS. 8a to 8c are perspective views of film length forming rollers with different shapes, that is, straight cylindrical, slightly rounded and tapered, respectively.
Figure 8B:
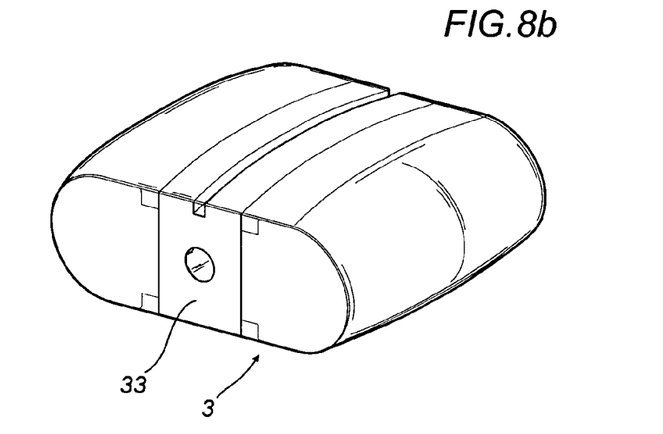
Figure 8C:
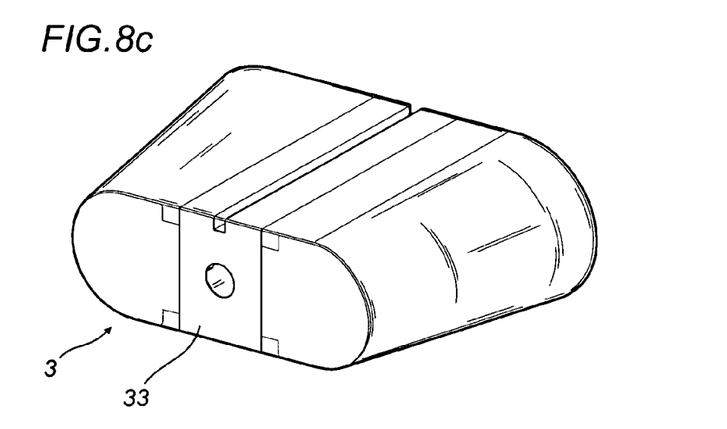

FIGS. 8a to 8c illustrate other possible embodiments of the forming rollers 3, with cylindrical, slightly rounded and tapered shapes.

Next to the hollow body 33 there are two curved plates 34 made, for example, from bent sheet metal, whose distance from each other may, if necessary, be adjusted through a threaded bar 49 engaged in matching threaded seats attached to the plates 34 in order to increase/decrease the size of the forming roller 3.

Advantageously, the profile of the side plates 34 may differ in accordance with the type and arrangement of the products being handled in order to adapt the shape of the film 6 to its subsequent use, for example, to enable the formed tube to be picked up by customary retractor pins.

In the flat surface of the body 33, there are small holes defining a suction conduit 14 which, at the station S1, is aligned with the head 31 of the applicator 8 so that the free edge 4 of the film portion 2 which is simultaneously released by the suction head 31 adheres to the surface of the forming roller 3 when the latter subsequently starts rotating.

FIG. 8a shows an alternative arrangement where, for holding the film, suction channels 14 bis, distributed on the surface of the forming roller 3, are used instead of or in addition to the conduit 14.

Figure 7A:
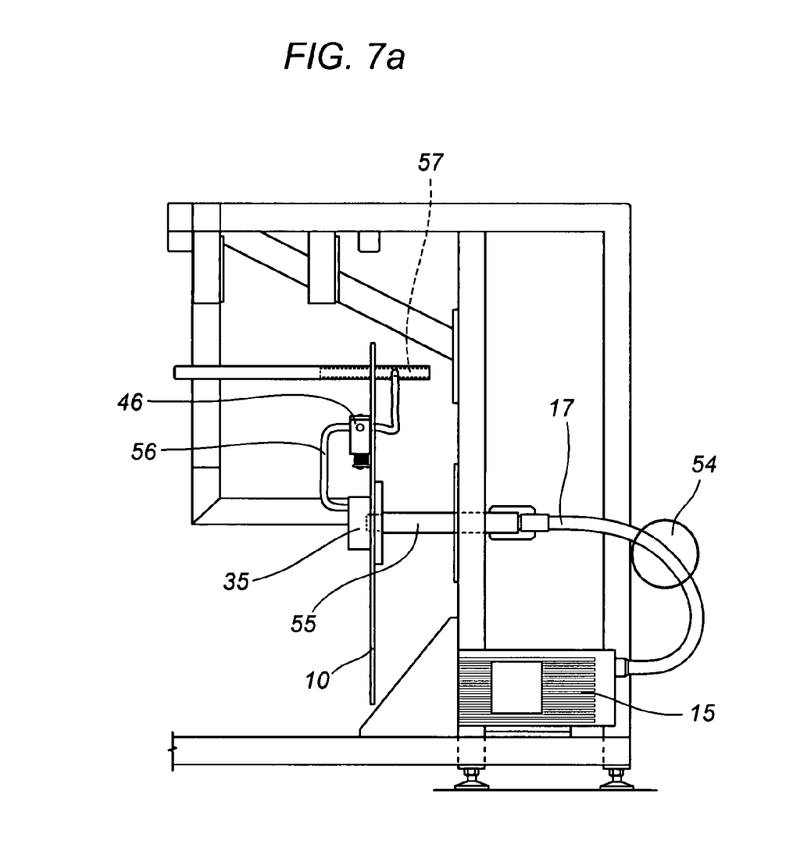
FIGS. 7a and 7b are, respectively, a side detail view and a front detail view showing the machine's pneumatic system.
Figure 7B:
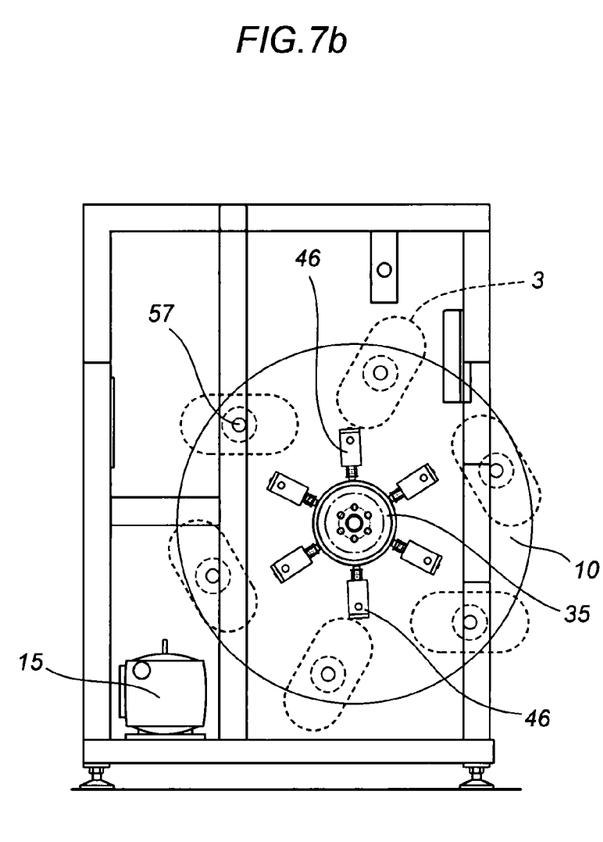

The suction system is shown in more detail in FIGS. 7a and 7b. The system comprises at least one pump 15, preferably equipped with a tank 54 serving as a plenum chamber, and a hollow shaft 55 leading to a central chamber or distributor 35 mounted on the carousel 10.

Pipes 56 run from the distributor 35 to the related valves 46 and from there to a conduit 57 that in turn communicates with the conduit 14 of the forming roller 3.

During operation, after the edge 4 has been brought into contact with the forming roller 3, the carousel 10 starts rotating in counterclockwise direction and the forming roller 3 rotates in the opposite direction in such a way that the portion of film 2 cut to size is wound around it until the free edges 4 and 5 of the film overlap.

The winding of the film 2 around the forming roller 3 may be aided by the passage over the forming roller 3 of a pressure roller 16 mounted at one end of an arm 36 whose other end 37 is hinged to the carousel 10 and which is elastically constrained, for example by a spring, to keep the pressure roller in contact with the surface of the forming roller.

With this solution, the pressure roller 16 helps smooth the film as it is unwound, while the pump 15 creates a vacuum in the forming roller which makes the film adhere.

Figure 3A:
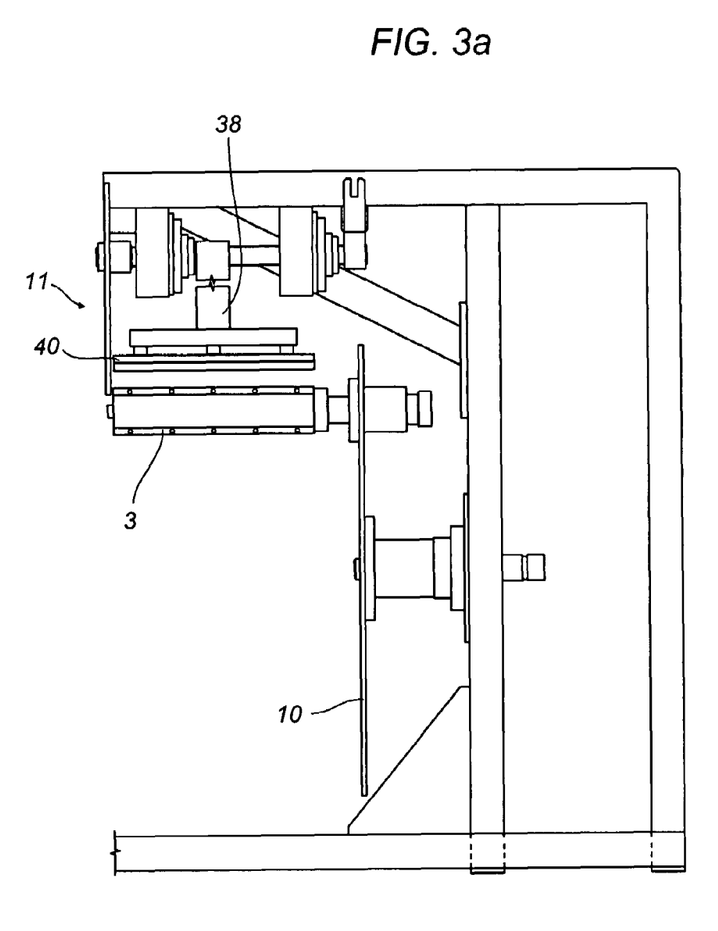
FIGS. 3a and 3b are, respectively, a right side detail view and a front detail view showing the device for sealing the film lengths.
Figure 3B:
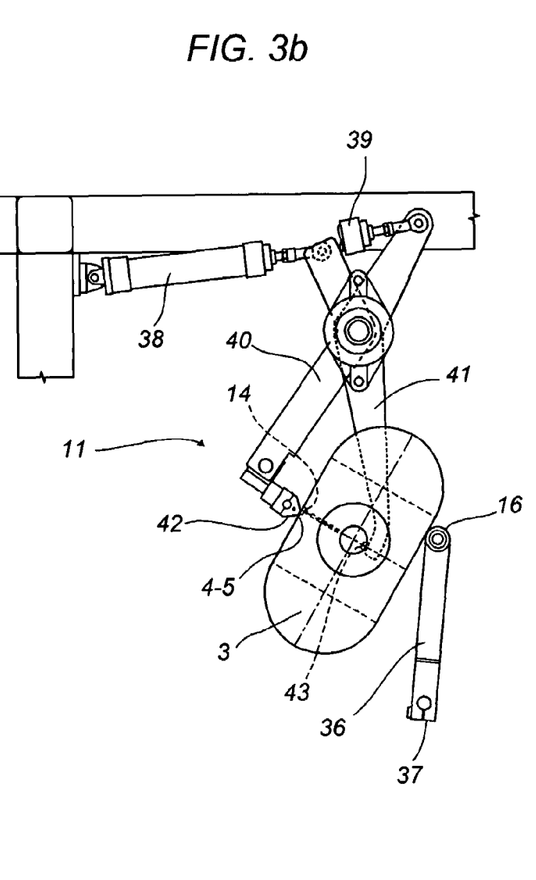

As the carousel continues to rotate, the forming roller 3 reaches the sealing station S3 with the overlap between the edges 4 and 5 on the upper side where it can be accessed by the sealing device 11, illustrated in more detail in FIGS. 3a and 3b.

Once the forming roller 3 has reached the station S3, the carousel 10 stops and a pair of pistons 38, 39 respectively actuate two arms 40, 41 mounting a sealing element 42, such as a continuous sealer, which joins the edges 4, 5 together at the overlap, and a contact element 43 designed to counteract the mechanical force exerted by the sealer on the forming roller 3.

Upon completion of the seal, the arms 38/39 reopen the arms 40, 41 in scissor-like fashion in such a way that they move away from the carousel so that it can start rotating again to move the forming roller 3 towards the unloading station S4.

During the passage from the station S3 to the station S4, the pressure roller 16 is moved away from the surface of the forming roller 3 by a lever 44 linked to the end 37 and constrained by the rotation of the carousel to interact with a cam 45, the latter being hinged to a pin 47 and driven from a raised position where it does not act on the lever 44 to a lowered position where it does act on it, causing the arm 36 to rotate clockwise and thereby moving the pressure roller 16 away from the forming roller 3.

At the station S4, a valve 46 switches the negative pressure created in the forming roller 3 by the pump 15 to a positive pressure so that the film length 6 formed can be removed from the forming roller 3 by the extractor 18.

Figure 4A:
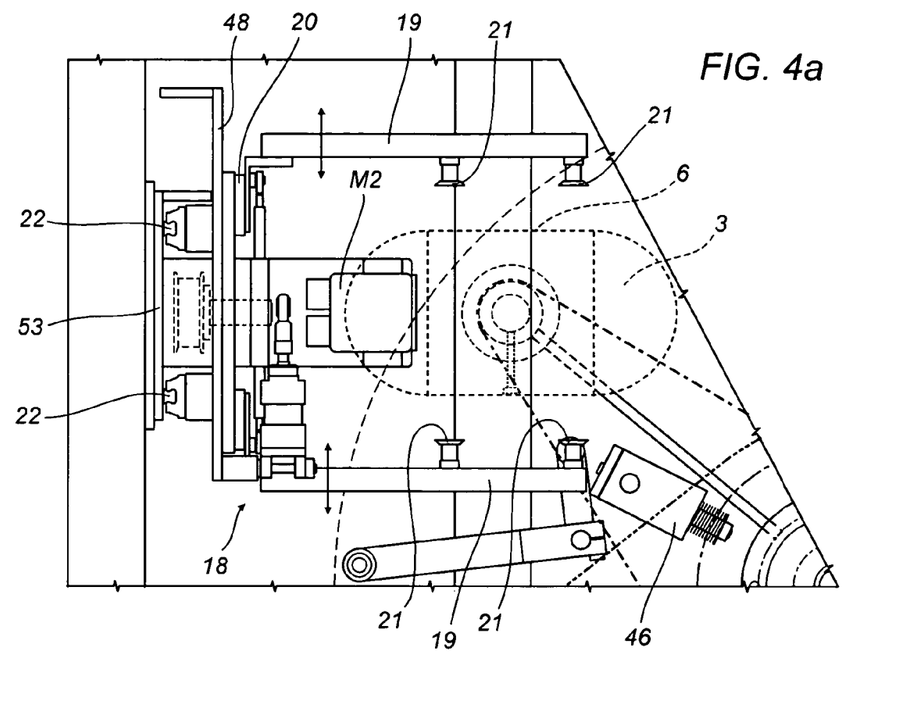
FIGS. 4a and 4b are, respectively, a front detail view and left side detail view showing the device for extracting the film lengths.
Figure 4B:
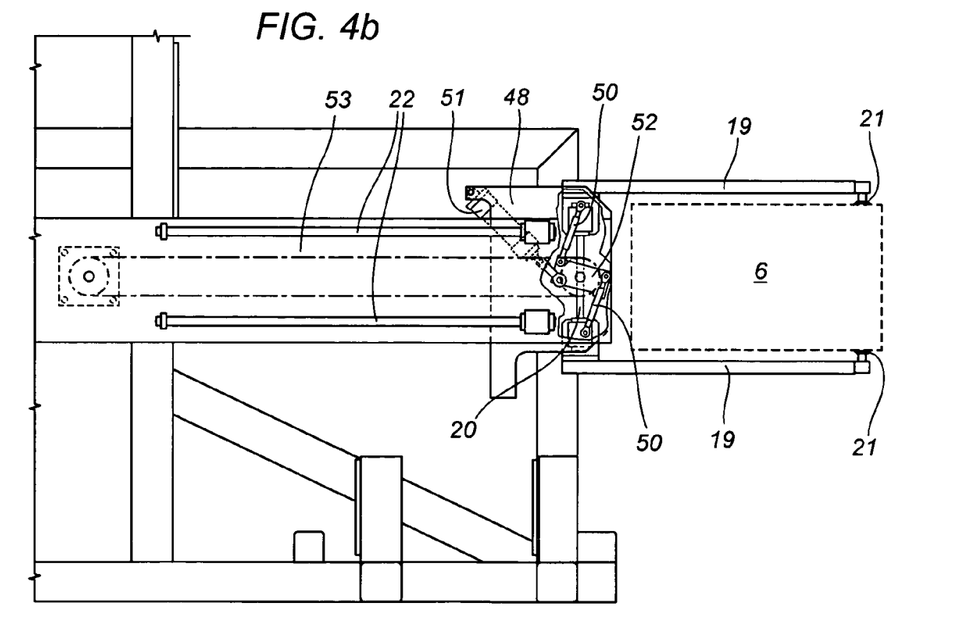
Figure 5A:
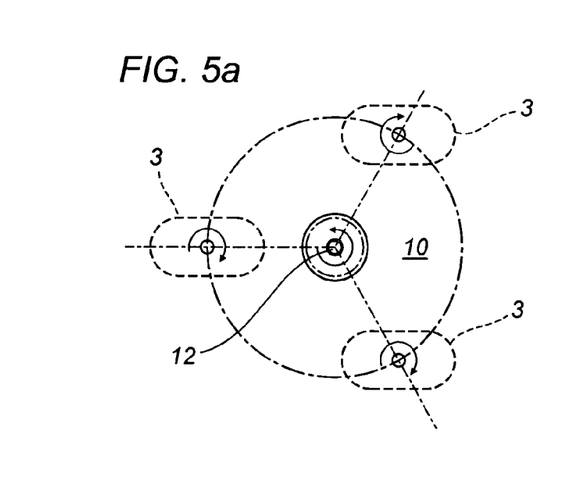
FIGS. 5a and 5b illustrate two alternative kinematic diagrams with three and four orbital forming rollers, respectively.
Figure 5B:
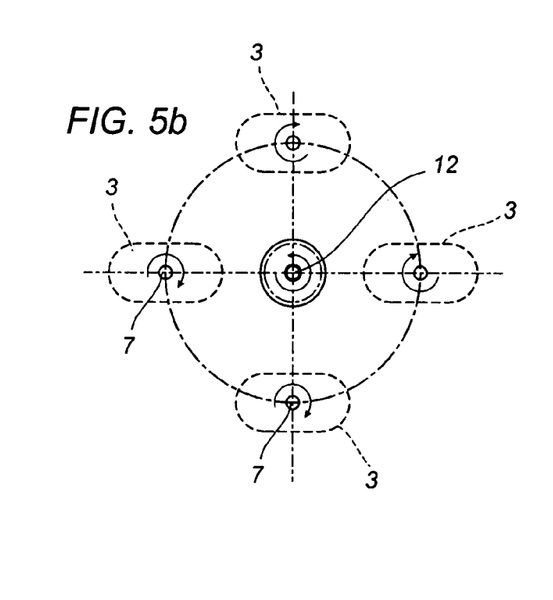

In the embodiment illustrated in FIGS. 4a and 4b, the extractor used in the machine according to the invention comprises a pair of arms 19 having a plurality of suction cups 21 connected to a vacuum system that is preferably independent of the suction system described above.

In the example illustrated, the arms have two suction cups 21 each and run in first straight guides 20 on a mobile plate 48 so as to move towards the opposite faces of the forming roller 3 in such a way that the suction cups can pick up the tubular film length 6 formed.

The arms 19 are preferably driven by connecting rods 50 linked to a rocking mechanism 52 actuated by a piston 51, although other equivalent drive mechanisms are imaginable without departing from the spirit of the invention.

Once the suction cups 21 are in contact with the film length 6, the mobile plate 48 may be made to run in second straight guides 22 on a fixed plate 53 in a direction parallel to the axis of the forming roller 3 in such a way as to remove the tubular film length 6.

Preferably, the mobile plate 48 is driven by a motor M2 comprising a brushless electric motor, although other, equivalent drive systems are imaginable.

Advantageously, the extractor 18 may either be synchronized with a wrapping machine so as to feed the film length 6 in step with the wrapping process or it may feed an intermediate buffer station or reservoir of film lengths 6 so that the step of forming the tubular film lengths does not necessarily need to be synchronized with the wrapping process.

Preferably, the invention also contemplates the provision of a rejection unit consisting, for example, of a pick-up arm similar to that of the extractor 18 and designed to remove and reject any badly formed film lengths.

The carousel 10 and the forming rollers 3 in the embodiment described above by way of example are designed to be mounted with their axes horizontal, but carousels and forming rollers designed to be mounted vertically, depending on their selected shapes, are also imaginable.

Furthermore, although the preferred embodiment described above includes several forming rollers 3 mounted around a carousel, the invention might also contemplate a single forming roller rotating about a fixed axis, with the feed, sealing and extraction units mounted around it.

Such an embodiment, although it offers lower levels of productivity, is advantageous where constructional simplicity and smaller machine size are required.

It will be understood that the invention described may be useful in many industrial applications and may be modified and adapted in several ways without thereby departing from the scope of the inventive concept. Similarly, all the details of the invention may be substituted by technically equivalent elements.

What is claimed is:

1. A machine for forming tubular film lengths from straight portions of film (2) fed by a feed unit (1), comprising:
   at least one forming roller (3) that revolves about an axis (7) transversal to the direction of film feed;
   means (14) for applying the film portion (2) to the surface of the forming roller (3) as it revolves, at least until opposite edges (4, 5) of the film portion (2) overlap; and
   means (11) for joining the overlapping edges (4, 5) to each other to form a tubular film length (6); wherein the means for applying the film portion (2) to the surface of the forming roller (3) comprise means (14) for holding a first edge (4) of the film portion (2) in a fixed position in a first winding area of the forming roller (3); further comprising a plurality of forming rollers (3) revolving about respective axes (7) equi-spaced by an angle (α) around a circumference of a carousel (10) that rotates about an axis (12).

2. The machine according to claim 1, further comprising six forming rollers (3) corresponding to six stations (S1-S6) located at equal angular intervals (α) of 60°.

3. The machine according to claim 1, further comprising means for kinematically linking the rotation of the carousel (10) about the axis (12) to the rotation of the forming rollers (3) about the respective axes (7).

4. The machine according to claim 3, further comprising an independent motor for rotationally driving the forming rollers (3) and the carousel (10).

5. The machine according to claim 4, wherein the carousel (10) and the forming rollers (3) rotate in opposite directions.

6. The machine according to claim 3, wherein the kinematic linking means create a rotation ratio of 1:5 between the carousel (10) and the forming rollers (3).

7. The machine according to claim 3, wherein the kinematic linking means consist of two toothed belts (13) that link the rotation of the carousel (10) to the rotation of groups of three contiguous forming rollers (3).

8. The machine according to claim 1, wherein the means for holding a first edge (4) of the film in a fixed position on a forming roller (3) comprise a suction conduit (14) located at the first winding area of each of the forming rollers (3).

9. The machine according to claim 1, wherein the conduit (14) consists of a series of channels (14 bis) leading into a main conduit connected to a system (15) for creating a vacuum.

10. The machine according to claim 9, wherein the system (15) for creating the vacuum comprises a vacuum pump (15) and pneumatic pipes (17) designed to create a sufficient vacuum in the conduit (14) to retain the first film edge (4).

11. The machine according to claim 9, further comprising an independent vacuum system (15) for each conduit (14) of each forming roller (3).

12. The machine according to claim 9, wherein the vacuum channels are located at two or more points on the forming roller (3) so as to increase the film retaining force.

13. The machine according to claim 1, wherein the means (14) for winding the film portion (2) around the forming roller (3) comprise means (16) for pressing and smoothing the film (2) wound around the forming roller (3).

14. The machine according to claim 1, wherein the means (14) for winding the film portion (2) around the forming roller (3) comprise a pressure roller (16) placed in contact with the film (2) wound around the forming roller (3).

15. The machine according to claim 1, wherein the means (11) for joining the overlapping edges (4, 5) consist of a sealing device (11) located at a sealing station (S3).

16. The machine according to claim 15, wherein there is an angular interval of 120° in the direction of rotation of the carousel (10) between the sealing station (S3) and a station (S1) for feeding the film portion (2).

17. The machine according to claim 1, further comprising pickup means for removing the tubular film length (6) from the forming roller (3).

18. The machine according to claim 17, wherein the pickup means consist of a transfer unit (18) equipped with means for holding the tubular film length (6).

19. The machine according to claim 18, wherein the holding means consist of one or more suction cups (21) connected to a suction conduit and designed to adhere to the outer surface of the tubular film length (6).

20. The machine according to claim 18, wherein the transfer unit (18) comprises at least one pair of arms (19), each having a plurality of suction cups (21), the arms (19) running on first straight guides (20) so as to move towards opposite faces of a forming roller (3) in such a way that the suction cups (21) can pick up the tubular film length (6) formed, and on second straight guides (22) parallel to the axis of the forming roller (3) in such a way as to slide the tubular film length (6) held by the suction cups (21) off the surface of the forming roller (3).

21. The machine according to claim 1, further comprising means for rejecting a tubular film length (6) formed by the forming rollers (3).

22. The machine according to claim 1, wherein the feed unit (1) comprises a conveyor belt (28) for feeding a film web from a roll and is equipped with means for cutting off a film portion (2) of the required size.

23. The machine according to claim 1, wherein the forming rollers (3) comprise cylindrical surfaces.

24. The machine according to claim 1, wherein the forming rollers (3) comprise at least one central body (33) and two lateral surfaces (34) that are interchangeable and adjustable according to the required size of the tubular film length (6).

25. The machine according to claim 1, wherein the profile of the lateral surfaces (34) differs in accordance with the type of product handled in order to adapt the shape of the film (6) to its subsequent use.

26. The machine according to claim 1, further comprising a reservoir of formed tubular film lengths (6).

* * * * *